United States Patent
Griffin et al.

(10) Patent No.: US 12,234,015 B2
(45) Date of Patent: Feb. 25, 2025

(54) FREE PLAY CHATTER SUPPRESSION

(71) Applicant: The Boeing Company, Arlington, VA (US)

(72) Inventors: Steven F. Griffin, Kihei, HI (US); Zackary L. Endsley, Kihei, HI (US)

(73) Assignee: The Boeing Company, Arlington, VA (US)

( * ) Notice: Subject to any disclaimer, the term of this patent is extended or adjusted under 35 U.S.C. 154(b) by 71 days.

(21) Appl. No.: 18/338,463

(22) Filed: Jun. 21, 2023

(65) Prior Publication Data
US 2024/0425172 A1    Dec. 26, 2024

(51) Int. Cl.
*F16F 1/36*    (2006.01)
*B64C 9/02*    (2006.01)

(52) U.S. Cl.
CPC .  *B64C 9/02* (2013.01); *F16F 1/36* (2013.01)

(58) Field of Classification Search
CPC ..................................... B64C 9/02; F16F 1/36
USPC .... 188/290, 291, 293, 294, 296, 322.5, 380; 244/99.2
See application file for complete search history.

(56) References Cited

U.S. PATENT DOCUMENTS

| | | | | |
|---|---|---|---|---|
| 3,119,469 | A * | 1/1964 | Farr | F16F 9/12 192/58.41 |
| 6,935,472 | B2 * | 8/2005 | Dussac | F16F 7/015 188/380 |
| 10,647,418 | B2 * | 5/2020 | Seifert | B64C 5/02 |
| 2004/0238688 | A1 * | 12/2004 | Audren | B64C 13/50 244/99.2 |
| 2005/0230534 | A1 * | 10/2005 | Pitt | B64C 13/00 244/87 |
| 2009/0159382 | A1 * | 6/2009 | Chemouni | F16F 9/145 188/290 |
| 2012/0024646 | A1 * | 2/2012 | Tsugihashi | F16F 15/363 188/268 |
| 2016/0325821 | A1 * | 11/2016 | Golshany | F16F 15/002 |

FOREIGN PATENT DOCUMENTS

WO    WO-2019139654 A1 *   7/2019   ............. B64C 13/34

* cited by examiner

*Primary Examiner* — Christopher P Schwartz
(74) *Attorney, Agent, or Firm* — Yee & Associates, P.C.

(57) ABSTRACT

An apparatus and method for suppressing free play chatter of a control surface of an aircraft. The free play chatter suppression apparatus includes a containment vessel connected to a control surface of an aircraft. A lossy material is contained within the containment vessel. A body is positioned within the lossy material. The deceleration of the body by the lossy fluid is transmitted to the control surface to dampen vibrations of the control surface.

20 Claims, 7 Drawing Sheets

FREE PLAY CHATTER SUPPRESSION

BACKGROUND INFORMATION

1. Field

The present disclosure relates generally to vibration damping. More specifically, the present disclosure relates to reducing free play chatter or vibration of control surfaces of aircraft during flight or to pass ground structural modal interaction tests.

2. Background

Control surfaces on aircraft (e.g., flaps, elevators, rudders, ruddervators, etc.) typically employ an actuator and/or a geared transmission. The control surfaces may also include linkages and other connections. The transmission and linkages have discontinuities (i.e., free play between gear teeth and linkage slop due to the spacing between links and gears) which creates a free play zone of movement of the control surface when no load is applied to the control surface. In the free play zone, structural modes of the control surfaces are lightly damped as they have no boundary condition and few loss mechanisms. This movement and these structural modes may result in excessive vibration and noise that can be dangerous or annoying to passengers of the aircraft.

Free play can't be completely eliminated with a discrete control surface. This creates a boundary condition on the control surface hinge line that is unconstrained and with little or no loss mechanisms within the free play zone. This can result in lightly damped modes of the control surface when, at very low amplitude excitation, might have very high, resonant response amplitudes which violate control gain margins and result in instability. However, the instability may immediately decrease in amplitude once the angle of the control surface has exceeded the free play zone and a different boundary condition and large loss mechanism is encountered. The amplitude dependent transition of vibration modes between unstable and stable behavior creates a limit cycle oscillation or other chatter increases the angle beyond the free play zone. This behavior might be temporary during takeoff and landing creating noise and vibration until sufficient speed builds to preload the control surface or it might persist during flight, creating a constant noise source with a vibration of the control surface.

The free play zone of movement can be reduced by a mechanical preload, such as a spring, and can also change with varying aerodynamic loading. Allowable free play is a specification on aircraft and is an important maintenance item. As joints loosen and surfaces wear, free play increases.

However, inclusion of a spring as a preload introduces cost and weight to an aircraft and further requires added force to overcome when the control surface receives a desired movement command. Further, as free play increases, adjustments or replacement of the preload would be required.

Therefore, it would be desirable to have a method and apparatus that takes into account at least some of the issues discussed above, as well as other possible issues.

SUMMARY

An illustrative embodiment of the present disclosure provides a free play chatter suppression apparatus comprises a containment vessel, a lossy material, and a body positioned within the lossy material. The containment vessel is connected to a control surface of an aircraft and the lossy material is contained within the containment vessel.

Another illustrative embodiment of the present disclosure provides a system for suppressing free play chatter of a control surface of an aircraft. An actuator has a geared transmission and is connected to the control surface of the aircraft. A containment vessel is connected to the control surface of the aircraft. A lossy material is contained within the containment vessel and a body is suspended within the lossy material.

A further illustrative embodiment of the present disclosure provides a method for suppressing free play chatter of a control surface of an aircraft. An actuator is mounted to a structural component of an aircraft. The actuator has either a geared transmission or a linkage or both. A control surface of the aircraft is connected to the actuator. A containment vessel is connected to the control surface and a lossy material is placed within the containment vessel. A body is positioned within the lossy material.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that actuators are connected to control surfaces of aircraft and are configured to move the control surface in response to movement commands.

The illustrative embodiments also recognize and take into account that geared transmissions and/or linkages of the actuators have free play between gear teeth and linkage slop due to the spacing between links and gears.

The illustrative embodiments also recognize and take into account that the free play creates a free play zone of movement or chatter of the control surface when no load is applied to the control surface. Movement or chatter of the control surface while in the free play zone may result in excessive vibration and noise that can be dangerous or annoying to passengers of the aircraft.

Thus, the illustrative embodiments provide a free play chatter suppression apparatus that prevents the movement or chatter of the control surface while the control surface is unloaded in the free play zone between gear teeth and/or linkage slop inherent in the actuator. By including a mass suspended in a lossy material contained in a vessel, where the vessel is attached to the control surface, the control surface is sufficiently damped to minimize or eliminate the free play chatter of the control surface.

Figure 1:
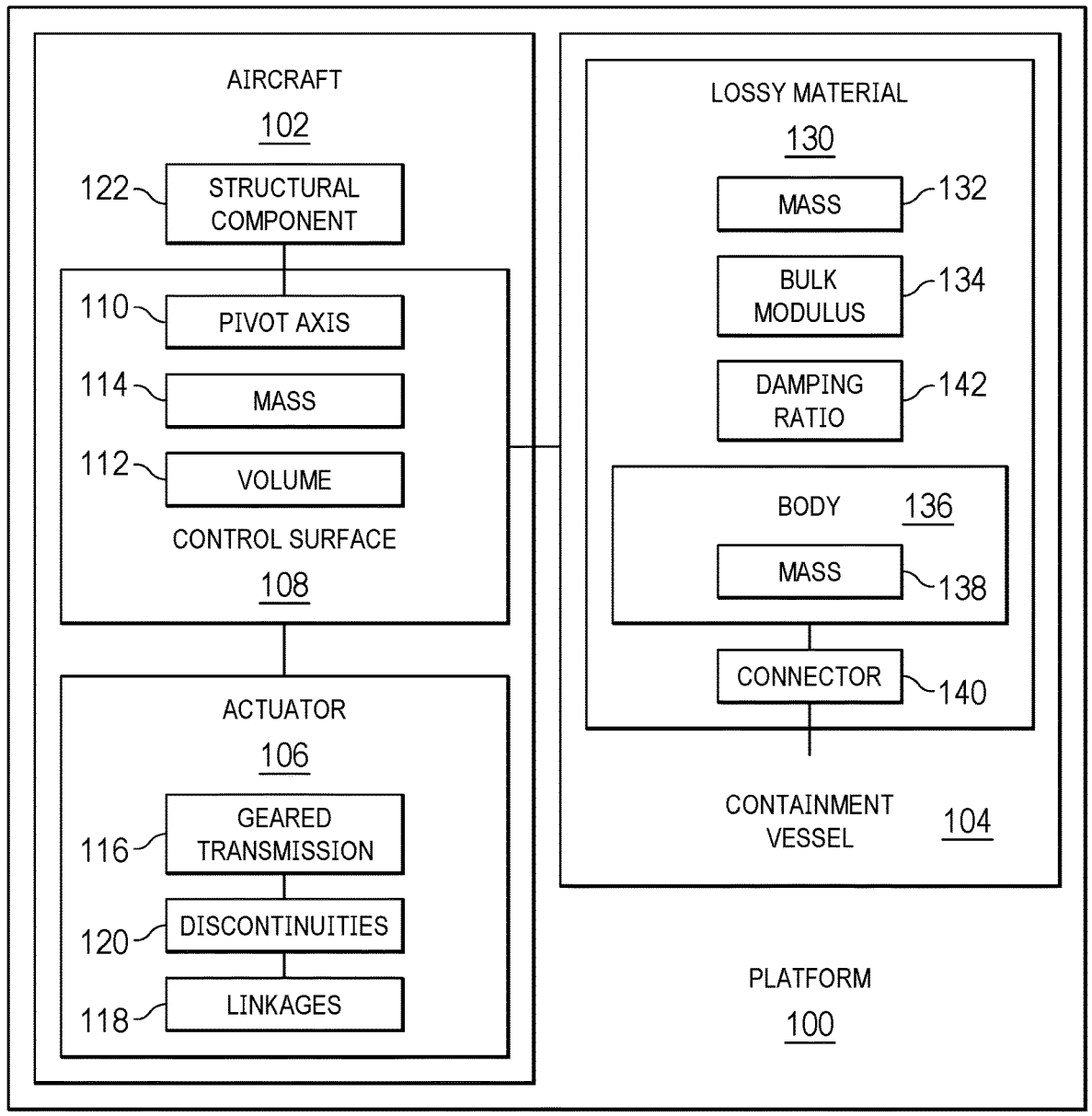
FIG. 1 is an illustration of a block diagram of a platform in accordance with an illustrative embodiment.

With reference now to the figures, in particular, with reference to FIG. 1, an illustration of a block diagram of a platform is depicted in accordance with an illustrative embodiment. Platform 100 has aircraft 102 and containment vessel 104 in this illustrative example.

Platform 100 may take a variety of different forms. For example, without limitation, platform 100 may be implemented in a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, a tool, a mechanical structure, or some other suitable platform or structure where chatter suppression is desirable.

In this illustrative example, platform 100 takes the form of aircraft 102. In this illustrative example, when platform 100 takes the form of aircraft 102, containment vessel 104 can be attached to aircraft 102.

In this illustrative example, aircraft 102 includes actuator 106 and control surface 108. Control surface 108 is connected to actuator 106. Commands initiated by an operator of aircraft 102 activate movement in actuator 106 which ultimately moves control surface 108 during operation of aircraft 102.

Control surface 108 includes pivot axis 110. Actuator 106 may be connected to control surface 108 via pivot axis 110. Non-limiting examples of control surface 108 may be one of a flap, an elevator, a rudder, or a ruddervator. Control surface 108 has volume 112. The structure and skin that make up the shape of control surface 108 define volume 112. Control surface has mass 114. Mass 114 of control surface 108 depends on desired use and dimensions of the aircraft control surface 108 is a part of.

Actuator 106 may include geared transmission 116. Actuator 106 may include linkages 118. Either or both geared transmission 116 and linkages 118 may include discontinuities 120. Discontinuities 120 associated with actuator 106 connected to control surface 108 may cause free play chatter of control surface 108 when control surface 108 is unloaded.

Aircraft 102 includes structural component 122. Aircraft 102 may include a set of structural components. Structural component 122 is at least one of stiffeners, ribs, spars, skin, etc. commonly found in an aircraft. Actuator 106 and/or pivot axis 110 of control surface 108 may be connected to structural component 122. When pivot axis 110 is connected to structural component 122, pivot axis 110 is grounded to structural component 122. As a result, control surface 108 can move with respect to structural component 122 while pivot axis remains fixed with respect to structural component 122.

As used herein, a "set of," when used with reference to items, means one or more items. For example, a "set of structural components" is one or more of structural component 122.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Containment vessel 104 is connected to control surface 108. Containment vessel 104 may be directly mounted to control surface 108. Containment vessel 104 may be attached to control surface within volume 112 of control surface 108. Containment vessel 104 may be attached to control surface exterior to/outside of volume 112 of control surface 108. Due to its connection to control surface 108, containment vessel 104 moves as control surface 108 moves. Control surface 108 includes pivot axis 110. Control surface 108 is connected to structural component 122 via pivot axis 110.

Containment vessel 104 contains lossy material 130. Lossy material has mass 132. A ratio of mass 114 of control surface 108 to mass 132 of lossy material 130 ranges from 10 to 50 depending on expected amount of potential chatter. Lossy material 130 has bulk modulus 134. Bulk modulus 134 has a value in the range of 1 to 2 GPa or 145,000 to 290,000 lbs/in$^2$. Lossy material 130 has damping ratio 142. Damping ratio 142 has a value in the range of 0.1 to 0.4. Lossy material 130 may be a viscous or viscoelastic material. Silicone, natural rubber, or mineral oil are examples of lossy material 130. Other materials may also be used if they have the desired bulk modulus and damping ratio. By altering bulk modulus 134 or damping ratio 142 of lossy material 130, either chemically or by physically exchanging, lossy material 130 can be considered tunable such that different amplitudes of chatter may be addressed if known. For example, if an amplitude of free play chatter is known, lossy material 130 can be specifically chosen which addresses the known amplitude.

Body 136 is positioned within lossy material 130. Body 136 has mass 138. Body 136 may be connected to containment vessel 104 with connector 140 within lossy material 130. Connector 140 may be a damper or spring. Connector 140 may include both springs and dampers. Body 136 is suspended within lossy material 130 such that mass 138 and bulk modulus 134 of lossy material 130 do not permit body 136 to sink in lossy material 130. In other words, body 136 "floats" suspended within lossy material 130 whether connector 140 is present or not.

A ratio of mass 114 of control surface 108 to mass 138 of body 136 is in a range of 10 to 50 depending on expected amount of potential chatter. Likewise, a ratio of mass 132 of lossy material 130 to mass 138 of body 136 is in a range of 10 to 100.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

Figure 2:
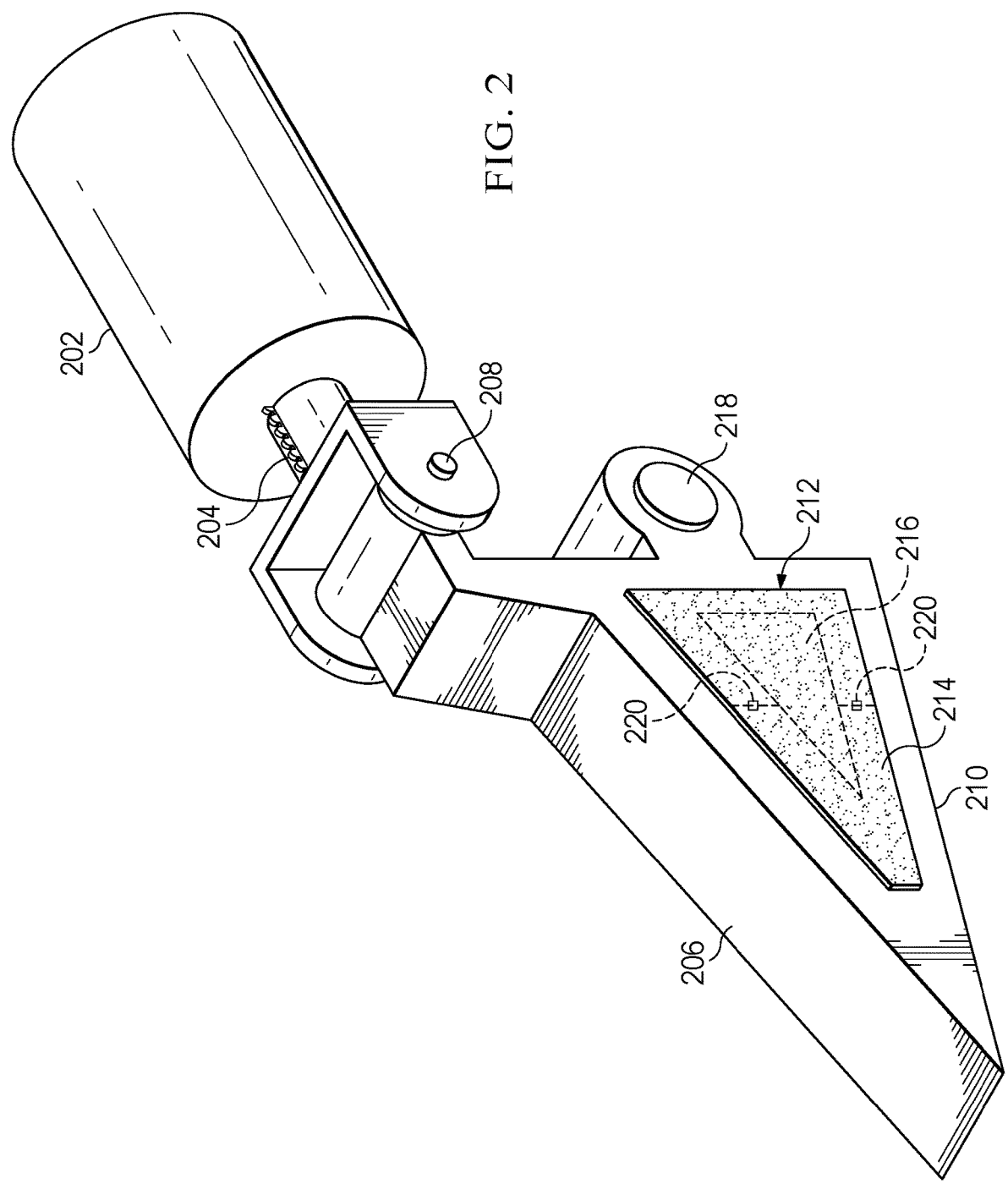
FIG. 2 is an illustration of a perspective view of a control surface of an aircraft in accordance with an illustrative embodiment.

With reference next to FIG. 2, an illustration of a control surface of an aircraft is depicted in accordance with an illustrative embodiment. In this illustrative example and the illustrative examples that follow, the same reference numeral may be used in more than one figure. This reuse of a reference numeral in different figures represents the same element in the different figures. The components illustrated in FIG. 2 are examples of physical implementations of control surface 108, actuator 106, containment vessel 104, lossy material 130, and body 136 shown in block form in FIG. 1.

As illustrated, actuator 202 includes geared transmission 204. Actuator 202 is connected to control surface 206 at pivot point 208. Control surface 206 pivots about pivot point 208 with respect to actuator 202. Control surface 206 includes pivot axis 218. Control surface 206 pivots about pivot axis 218 with respect to the aircraft to which control surface 206 is mounted to.

The illustration of control surface 206 is not meant to limit the manner in which an illustrative example can be implemented in a control surface.

The structural components and skin that make up the shape of control surface 206 define volume 210 of control surface 206. Containment vessel 212 is connected to control surface 206. Due to its connection to control surface 206, containment vessel 212 moves as control surface 206 moves. Containment vessel 212 is positioned within volume 210 of control surface 206. While the shape of containment vessel 212 is depicted as generally mimicking the shape of control surface 206, it is not necessary. Containment vessel 212 can be any shape, and in this illustrative example is contained within volume 210.

Containment vessel 212 contains lossy material 214. Lossy material 214 is a material that can conform to the shape of containment vessel 212. For example, lossy material 214 has an bulk modulus with a value in the range of 1 to 2 GPa or 145,000 to 290,000 lbs/in$^2$.

Body 216 is positioned within lossy material 214. Body 216 is connected to containment vessel 212 by connector 220 within lossy material 214. However, connector 220 may not be necessary. Connector 220 may be a damper or spring. Connector 220 may include both springs and dampers. Body 216 is suspended within lossy material 214. The shape or mass of body 216 and the bulk modulus of lossy material 214 and, if present, connector 220 do not permit body 216 to sink in lossy material 214. Body 216 is free to move within lossy material 214 against the friction provided by the bulk modulus value of lossy material 214, only bound by containment vessel 212. Movement of body 216 is slowed or decelerated because of lossy material 214 which in turn lessens the energy of the control surface which ultimately suppresses free play chatter of the control surface. In other words, when the control surface and attached containment vessel move, the body within the containment vessel has mass and is reluctant to move because masses at rest like to stay at rest. This creates relative deflection/motion in the lossy material, which takes away chatter energy and converts it to heat.

Figure 3:
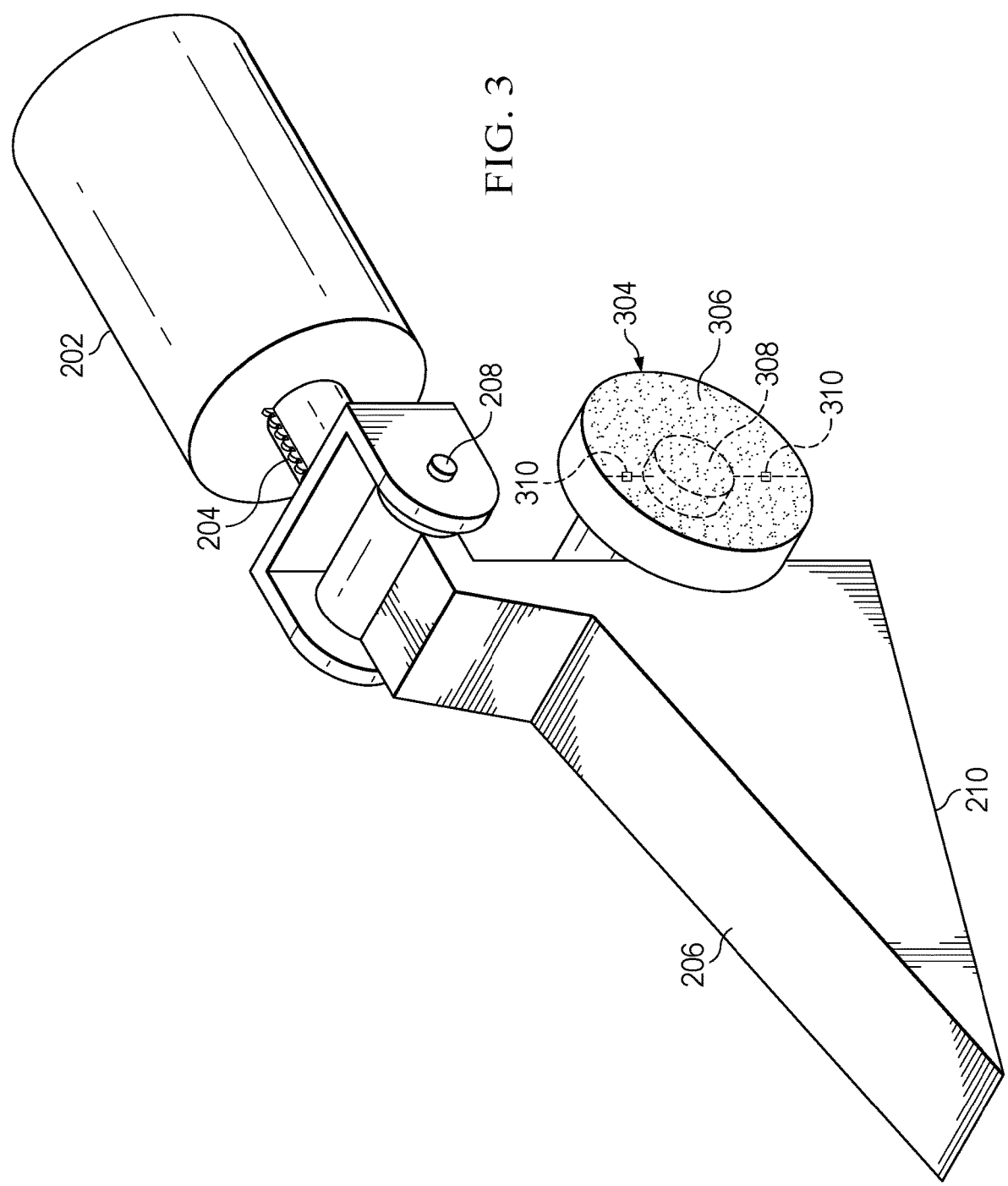
FIG. 3 is an illustration of a perspective view of a control surface of an aircraft in accordance with an illustrative embodiment.
Figure 4:
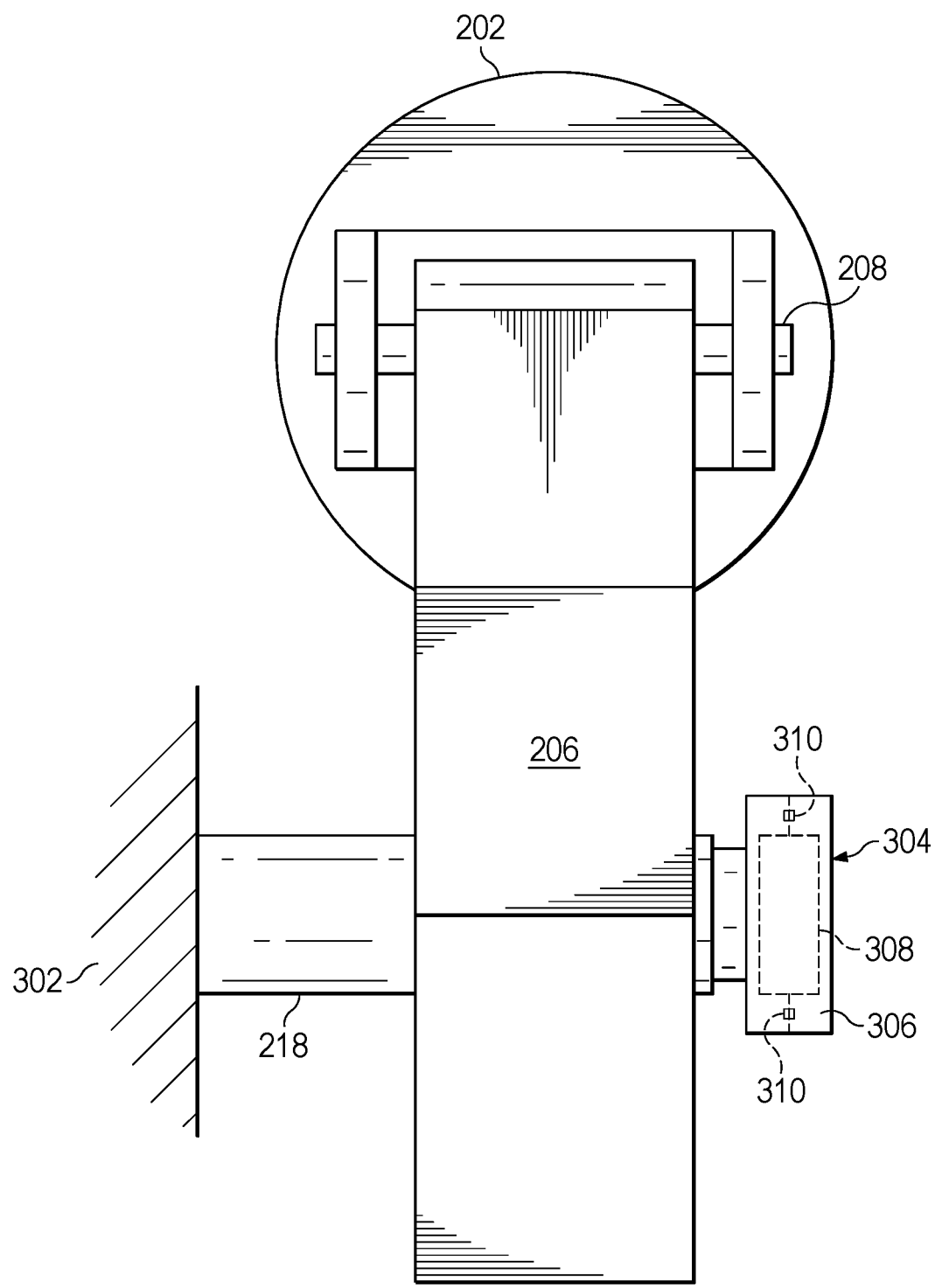
FIG. 4 is an illustration of an end view of a control surface of an aircraft in accordance with an illustrative embodiment.

With reference next to FIG. 3 and FIG. 4, illustrations of a control surface of an aircraft are depicted in accordance with an illustrative embodiment.

In these illustrated examples, actuator 202 includes geared transmission 204. Actuator 202 is connected to control surface 206 at pivot point 208. Control surface 206 pivots about pivot point 208 with respect to actuator 202. Control surface 206 includes pivot axis 218. Control surface 206 pivots about pivot axis 218 with respect to the aircraft. Connection 302 indicates pivot axis 218 is connected to an aircraft structural component.

Containment vessel 304 is mounted to control surface 206 at pivot axis 218. Due to its connection to control surface 206, containment vessel 304 moves as control surface 206 moves. While the shape of containment vessel 304 is depicted as generally disc-shaped, the shape of containment vessel 212 can be any shape permitted by space limitations surrounding control surface 206 and actuator 202.

Containment vessel 304 contains lossy material 306. Lossy material 306 is a material that can conform to the shape of containment vessel 304. Body 308 is positioned within lossy material 306. As depicted, body 308 is connected to containment vessel 304 with connector 310 within lossy material 306, however, connector 310 may not be necessary. Body 308 is suspended within lossy material 306. Body 308 is free to move within lossy material 306 with respect to containment vessel 304 and bound by containment vessel 304. Body 308 may also include exterior fins and through-holes (not shown) to assist in creating the relative deflection/motion in lossy material 306 as body 308 moves relative to lossy material 306.

Figure 5:
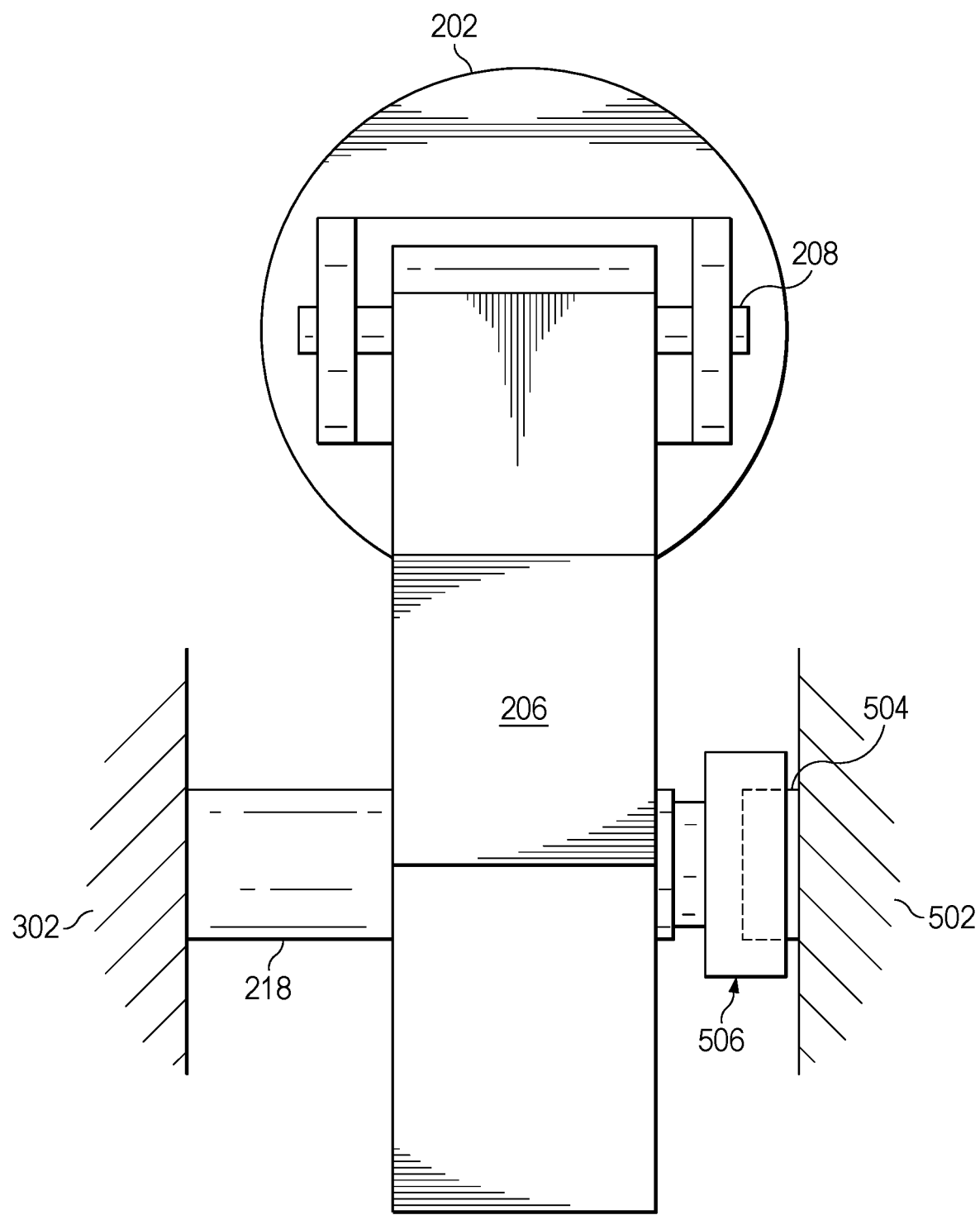
FIG. 5 is an illustration of an end view of a control surface of an aircraft in accordance with an illustrative embodiment.

With reference next to FIG. 5, an illustration of a control surface of an aircraft is depicted in accordance with an illustrative embodiment.

As illustrated, actuator 202 is connected to control surface 206 at pivot point 208. Control surface 206 pivots about pivot point 208 with respect to actuator 202. Control surface 206 includes pivot axis 218. Control surface 206 pivots about pivot axis 218 with respect to the aircraft. Connection 302 indicates pivot axis 218 is connected to an aircraft structural component.

Containment vessel 506 is mounted to control surface 206 at pivot axis 218. Due to its connection to control surface 206, containment vessel 506 moves as control surface 206 moves. While the shape of containment vessel 506 is depicted as generally disc-shaped, the shape of containment vessel 506 can be any shape permitted by space limitations surrounding control surface 206 and actuator 202.

Containment vessel 506 is sized to receive disc 504. Connection 502 indicates disc 504 is connected to an aircraft structural component. The relationship between disc 504 and containment vessel 506 can be magnetic or frictional. As a result, as containment vessel 506 moves as a result of its connection to control surface 206, disc 504 slows or decelerates the movement of containment vessel 506 and ultimately control surface 206. In other words, as a result of the frictional connection between disc 504 and containment vessel 506 or as a result of an opposite magnetic polarity between disc 504 and containment vessel 506, relative movement of containment vessel 506 and the connected control surface 206 is slowed or damped which thus takes away chatter energy/movement of control surface 206.

Figure 6:
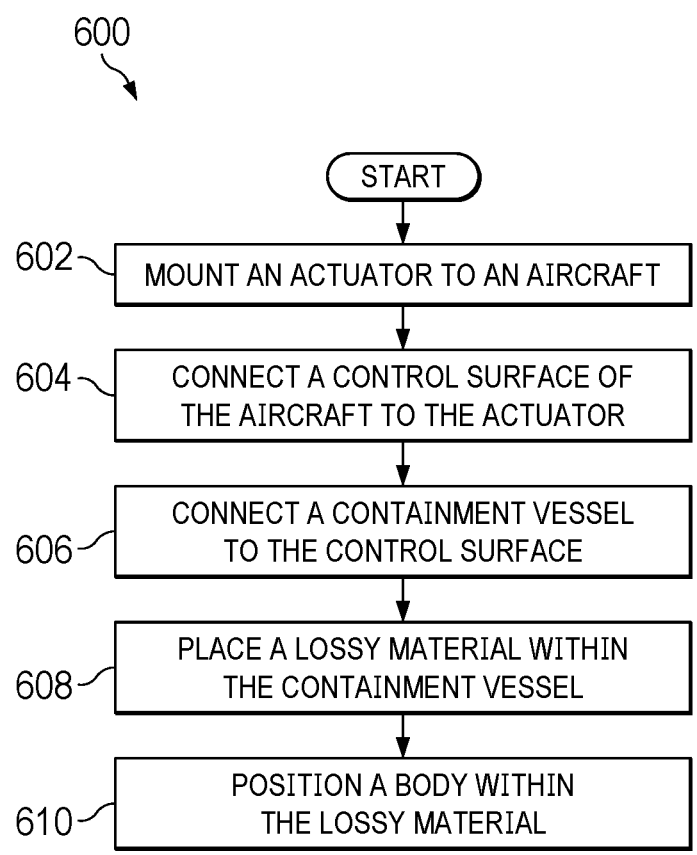
FIG. 6 of a flowchart of a process for suppressing free play chatter of a control surface of an aircraft in accordance with an illustrative embodiment.

With reference next to FIG. 6, an illustration of a flowchart of a process 600 for suppressing free play chatter of a control surface of an aircraft is depicted in accordance with an illustrative embodiment. The method depicted in FIG. 6 may be used in conjunction with the free play chatter suppression apparatus depicted in FIGS. 1-4.

The process begins by mounting an actuator to an aircraft (operation 602). The process connects a control surface of the aircraft to the actuator (operation 604). The actuator has at least a geared transmission or linkage. The geared transmission or linkages include discontinuities that may lead to free play chatter of a control surface of the aircraft. At operation 606, the process connects a containment vessel to the control surface. The containment vessel moves as the control surface moves. At operation 608, the process places a lossy material within the containment vessel. At operation 610, the process positions a body within the lossy material. The lossy material has a bulk modulus sufficient to "float" the body within the lossy material. Positioning the body within the lossy material may comprise connecting the body to the containment vessel with connectors, the connectors may be springs or dampers or both.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 7:
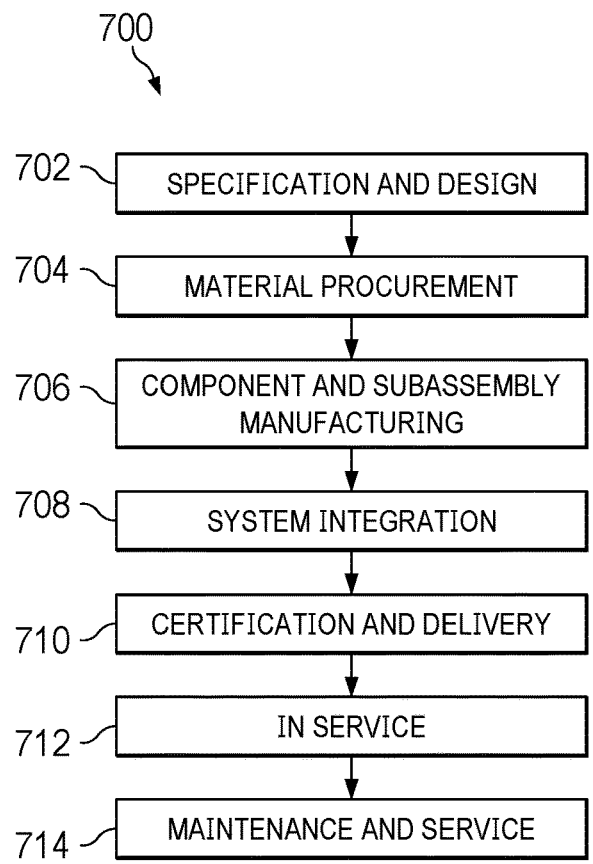
FIG. 7 is an illustration of a block diagram of an aircraft manufacturing and service method in accordance with an illustrative embodiment.
Figure 8:
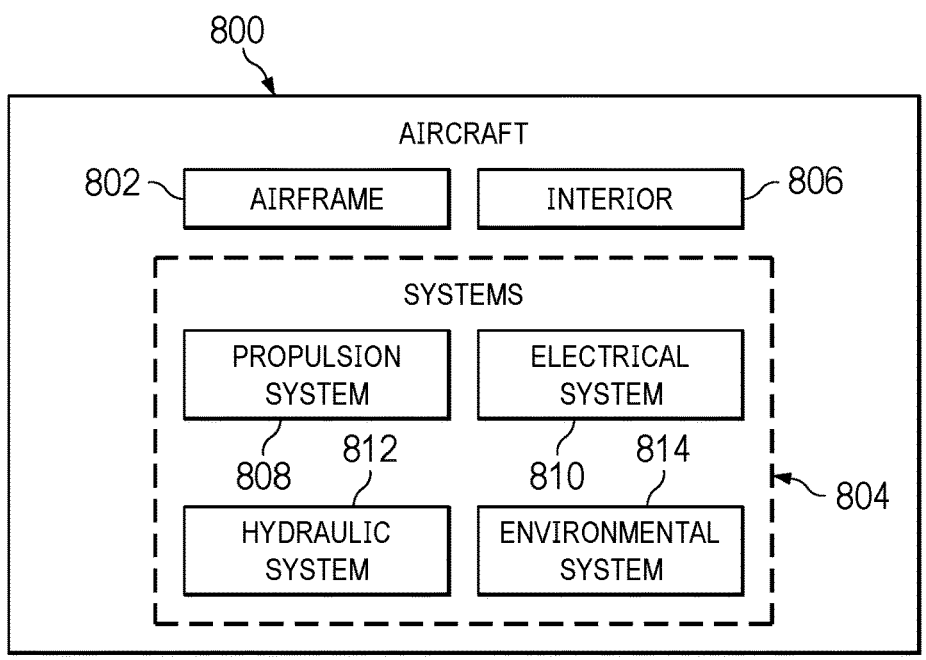
FIG. 8 is an illustration of a block diagram of an aircraft in which an illustrative embodiment may be implemented.

The illustrative embodiments of the disclosure may be further described in the context of aircraft manufacturing and service method 700 as shown in FIG. 7 and aircraft 800 as shown in FIG. 8. Turning first to FIG. 7, an illustration of a block diagram of an aircraft manufacturing and service method is depicted in accordance with an illustrative embodiment. During pre-production, aircraft manufacturing and service method 700 may include specification and design 702 of aircraft 800 in FIG. 8 and material procurement 704.

During production, component and subassembly manufacturing 706 and system integration 708 of aircraft 800 in FIG. 8 takes place. Thereafter, aircraft 800 in FIG. 8 may go through certification and delivery 710 in order to be placed in service 712. While in service 712 by a customer, aircraft 800 in FIG. 8 is scheduled for routine maintenance and service 714, which may include modification, reconfiguration, refurbishment, and other maintenance, service, or inspection.

The apparatus of this disclosure may be installed on an aircraft during component and subassembly manufacturing 706. In addition, the apparatus of this disclosure may be retrofitted onto aircraft 800 in FIG. 8 during routine maintenance and service 714 as part of a modification, reconfiguration, or refurbishment of aircraft 800 in FIG. 8.

Each of the processes of aircraft manufacturing and service method 700 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 8, an illustration of a block diagram of an aircraft is depicted in which an illustrative embodiment may be implemented. In this example, aircraft 800 is produced by aircraft manufacturing and service method 700 in FIG. 7 and may include airframe 802 with plurality of systems 804 and interior 806. Examples of systems 804 include one or more of propulsion system 808, electrical system 810, hydraulic system 812, and environmental system 814. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 700 in FIG. 7. In one illustrative example, components or subassemblies produced in component and subassembly manufacturing 706 in FIG. 7 may be fabricated or manufactured in a manner similar to components or subassemblies produced while aircraft 800 is in service 712 in FIG. 7. As yet another example, one or more apparatus embodiments, method embodiments, or a combination thereof may be utilized during production stages, such as component and subassembly manufacturing 706 and system integration 708 in FIG. 7. One or more apparatus embodiments, method embodiments, or a combination thereof may be utilized while aircraft 800 is in service 712, during maintenance and service 714, inclusive of inspection, in FIG. 7, or both. The use of a number of the different illustrative embodiments may substantially expedite the assembly of aircraft 800, reduce the cost of aircraft 800, or both expedite the assembly of aircraft 800 and reduce the cost of aircraft 800.

The illustrative embodiments provide a free play chatter suppression apparatus that prevents the movement or chatter of a control surface of an aircraft while the control surface is unloaded in the free play zone between gear teeth and/or linkage slop inherent in an actuator. By including a mass suspended in a lossy material contained in a vessel, where the vessel is attached to the control surface, the control surface is sufficiently damped to minimize or eliminate the free play chatter of the control surface. When the control surface tries to move, the mass suspended in the lossy material inside it wants to stay where it is, because masses at rest like to stay at rest. This creates relative displacement in the lossy suspension of the mass, which damps (takes energy away from) the movement/chatter of the control surface.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus configured to suppress free play chatter, wherein the apparatus comprises:
    a containment vessel mounted to a pivot axis of a control surface of an aircraft, wherein the containment vessel is configured to move with the control surface as the control surface pivots about the pivot axis;
    a lossy material contained within the containment vessel; and
    a body positioned within the lossy material.

2. The apparatus of claim 1, wherein the containment vessel is positioned within a volume defined by the control surface of the aircraft.

3. The apparatus of claim 1, wherein the-body within the lossy material is suspended within the lossy material without any direct connection between the body and the containment vessel.

4. The apparatus of claim 3, wherein the pivot axis is grounded to a structural component of the aircraft.

5. The apparatus of claim 1, wherein the control surface of the aircraft is selected from at least one of a flap, an elevator, a rudder, and a ruddervator.

6. The apparatus of claim 1, further comprising an actuator having a geared transmission, the actuator connected to the control surface, wherein the geared transmission includes discontinuities that result in free play of the control surface.

7. The apparatus of claim 1, wherein the lossy material is tunable.

8. The apparatus of claim 1, wherein the lossy material is a viscous or viscoelastic material.

9. The apparatus of claim 1, wherein the lossy material has a bulk modulus in a range of 1 to 2 GPa.

10. The apparatus of claim 1, wherein a ratio of a mass of the control surface to a mass of the body is in a range of 10 to 50.

11. The apparatus of claim 1, further comprising a connector connected to the body and the containment vessel within the lossy material.

12. The apparatus of claim 1, wherein the body is suspended within the lossy material with no direct connection to the containment vessel.

13. A system configured to suppress free play chatter of a control surface of an aircraft, wherein the system comprises:
    the control surface of the aircraft;
    an actuator having a geared transmission, the actuator connected to the control surface;
    a containment vessel mounted to a pivot axis of the control surface of the aircraft, wherein the containment vessel is configured to move with the control surface as the control surface pivots about the pivot axis;
    a lossy material contained within the containment vessel; and
    a body suspended within the lossy material.

14. The system of claim 13, wherein the containment vessel is positioned within a volume defined by the control surface of the aircraft.

15. The system of claim 13, wherein the control surface is directly connected to the pivot axis.

16. The system of claim 13, wherein the containment vessel moves with movement of the control surface.

17. A method for suppressing free play chatter of a control surface of an aircraft, the method comprising:
    mounting an actuator to the aircraft, wherein the actuator has at least one of a geared transmission or a linkage;
    connecting the control surface of the aircraft to the actuator, wherein the control surface includes a pivot axis;
    mounting a containment vessel to the pivot axis of the control surface;
    moving the containment vessel with the control surface while pivoting the control surface about the pivot axis;
    placing a lossy material within the containment vessel; and
    positioning a body within the lossy material.

18. The method of claim 17, wherein the containment vessel is positioned within a volume defined by the control surface of the aircraft.

19. The method of claim 17, wherein the containment vessel is directly connected to the pivot axis.

20. The method of claim 17, wherein positioning the body within the lossy material comprises suspending the body within the lossy material without any direct connection between the body and the containment vessel.

* * * * *